United States Patent [19]

Raths

[11] Patent Number: 4,509,583

[45] Date of Patent: Apr. 9, 1985

[54] APPARATUS FOR REGENERATIVE FLUE GAS HEAT EXCHANGER

[75] Inventor: Günther Raths, Olpe, Fed. Rep. of Germany

[73] Assignee: Apparatebau Rothemühle Brandt & Kritzler Gesellschaft mit beschränkter Haftung, Rothemühle, Fed. Rep. of Germany

[21] Appl. No.: 543,958

[22] Filed: Oct. 20, 1983

[30] Foreign Application Priority Data

Oct. 21, 1982 [DE] Fed. Rep. of Germany ....... 3238941

[51] Int. Cl.³ ............................................. F28D 17/00
[52] U.S. Cl. .......................................... 165/4; 165/8
[58] Field of Search ............................. 165/4, 7, 8, 9

[56] References Cited

U.S. PATENT DOCUMENTS 3,802,489 4/1974 Kirchhoff et al. ...................... 165/7
4,047,559 9/1977 Asplund et al. ........................ 165/7
4,114,680 9/1978 Kritzler et al. ........................ 165/4
4,446,911 5/1984 Reidick et al. ........................ 165/4

Primary Examiner—Edward G. Favors
Attorney, Agent, or Firm—Karl F. Ross; Herbert Dubno

[57] ABSTRACT

A flue gas scrubbing system for fossil fuel power plant boilers in which the flue gas traverses an air heater from the boiler and an electrostatic or another particulate removal unit before fully or partially passing through a heat exchanger which is used to reheat the clean gas produced by scrubbing all or part of the crude flue gas. To prevent water droplets in the clean gas from entering the heat exchanger, a portion of the crude gas or preferably a recirculated portion of the reheated clean gas is introduced into said clean gas before it enters the heat exchanger with or without further heating, e.g. in indirect heat exchange with a portion of the crude gas branched from a location upstream of the air heater.

6 Claims, 7 Drawing Figures

APPARATUS FOR REGENERATIVE FLUE GAS HEAT EXCHANGER

FIELD OF THE INVENTION

My present invention relates to an apparatus for regenerative heat recovery in the processing of a flue gas of a fossil-fuel combustion chamber, especially a combustion chamber of a steam-producing boiler and, especially, a boiler for producing steam in a fossil-fuel electric power plant.

The invention is specific to the reheating and predrying of a gas which may be scrubbed as part of the gas cleaning operation and which is obtained from a boiler utilizing a regenerative heat exchanger independent of the air preheater of the boiler. The invention also deals with a particular construction of a regenerative heat exchanger for use in carrying out this process or method.

BACKGROUND OF THE INVENTION

A process for the reheating and predrying of a pure gas obtained by scrubbing a flue gas from a boiler, utilizing a regenerative heat exchanger, and the regenerative heat exchanger utilized in this process are described in the journal "Energie", volume 32, number 12, December 1980, pages 463–465.

In this article, a regenerative heat exchanger takes up heat from a portion of the total quantity of flue gas branched therefrom ahead of the scrubber or washer and transfers heat to a portion of the scrubbed, washed or "cleaned" gas downstream of the washer. The resulting cooled portion of the unwashed or crude flue gas is recombined with the balance of the crude flue gas before it enters the washer and the heated portion of the cleaned gas is recombined with the balance of the cleaned gas also downstream of the washer.

Operations with such systems and the conventional regenerative heat exchanger utilized therein has shown that, in spite of the provision a droplet separator downstream of the washer, the pure gas or cleaned gas from the latter contains a high proportion of water which tends to result in contamination, soiling and corrosion in the heat storage masses of the regenerative heat exchanger and especially in deposits upon the heat exchange surfaces of the latter as the water which deposited therein evaporated.

German patent document (open application) DE-OS No. 2900275 describes a process and a device for the reheating of the clean gas following a scrubbing operation and utilizing the so-called recirculation principle. Here the flue gas from a combustion installation is passed through a dust separator and the entire quantity or flow of this flue gas before entering the scrubber is passed through the regenerative heat exchanger and cooled. Simultaneously, from the total quantity of clean gas leaving the scrubber, a portion of the clean gas is branched and, for reheating, is conducted through the regenerative heat exchanger before it is mixed with the balance of the clean gas to raise the temperature of the resulting mixture.

This latter process has been found to be effective when the flue gas leaving the combustion installation has a temperature between 250° C. and 300° C. which may be the case in combustion systems other than steam boilers in power plant applications. In such applications, the temperature of the flue gas downstream of the air preheater is only about 130° C. and at such temperatures this prior art method cannot operate.

OBJECTS OF THE INVENTION

It is, therefore, the principal object of the present invention to provide an improved apparatus of and apparatus for the regenerative reheating of a clean flue gas whereby the disadvantages of earlier systems can be obviated and especially the disadvantages of the systems described can be overcome.

Another object of this invention is to provide an apparatus for the purposes described which can be utilized with a high degree of efficiency for power plant boiler, particularly where the flue gas downstream of the air preheater is of a comparatively low temperature.

Still another object of the invention is to provide an improved regenerative heat exchanger which can be utilized in a more efficient energy transfer to the clean flue gas downstream of a scrubber without disadvantages of the type previously discussed, especially contamination by substances entrained in moisture from the scrubber.

A more specific object of this invention is to provide a regenerative heat exchanger and a process for the reheating and predrying of flue gas from a flue gas scrubber in a steam boiler power plant installation which can have minimum capital, maintenance and operating costs, which insures a high degree of drying of the cool gas, which minimizes the tendency for contamination of the regenerative heat exchanger surfaces, and which can utilize a cooled flue gas of comparatively low temperature.

SUMMARY OF THE INVENTION

These objects and others which will become apparent hereinafter are attained, in accordance with the present invention in a process for the regenerative treatment of a flue gas derived from a power plant combustion chamber wherein, from the entire quantity of the crude flue gas upstream of the air preheater for the combustion in this chamber, i.e. upstream of the boiler air preheater, a portion of the crude gas is branched and passed directly through one part of a regenerative heating mass.

Simultaneously, after traversing the air preheater and in a dust removal and compressor along its path, the total quantity of the crude flue gas is passed through another section of the same regenerative heat exchanger, the branched portion of the now somewhat cooled crude flue gas being returned to this balance of the crude flue gas before it passes through the second section of the heat exchanger.

After passing through the second section of the heat exchanger, the crude flue gas is fed to the scrubber or washer in which it is subjected to a conventional water wash to produce the cleaned flue gas.

The cleaned flue gas is passed through a previously heated second section of the regenerative heat exchanger and downstream of the latter a portion of this cleaned flue gas is branched therefrom and passed through a previously heated first section of the regenerative heat exchanger, the cleaned flue gases passing through the respective sections of the regenerative heat exchanger in counter flow to the flow directions of the crude flue gas through the corresponding sections of the heat exchanger before the functional interchange of the sections i.e. the switchover of the sections from heat pick up from the crude flue gas to heating of the cleaned flue gas.

The branched portion of the clean flue gas after traversing the respective first section of the heat exchanger is mixed with the clean flue gas upstream of the corresponding second section to traverse the latter therewith.

Stating the invention more generally, a regenerative heat exchanger mass for the purposes described is divided into functionally interchangeable sections, the term "functionally interchangeable" referring to the fact that each section will pick up thermal energy from the crude flue gas and deliver thermal energy to the cleaned flue gas. In one of the essential features of the invention, after the entire flow of cleaned flue gas leaves the scrubber it is passed through one of these sections of the heat exchanger to be heated by the thermal energy previously transferred thereto from the crude flue gas. According to another essential aspect of the invention, an additional stream of gas which is at a higher temperature than the clean flue gas leaving the scrubber, is introduced into this flow before it enters the latter section of the regenerative heat exchanger.

In one embodiment of the invention as just described, this additional portion of gas at a higher temperature than the gas leaving the scrubber is a portion of the clean flue gas branched from the main stream thereof downstream of the heat exchanger and returned to the main stream of clean flue gas upstream of the heat exchanger. Preferably the temperature of this gas is raised even further by passing it through another portion of the heat exchanger mass in the manner described and, preferably, also by compression.

According to another embodiment of the invention, the branched returned portion of the clean gas is heated only by compression. In still a third embodiment of the invention the further portion of the gas at the higher temperature is drawn from the crude flue gas stream upstream of its passage through another section of the heat exchanger.

In the first embodiment of the invention, in spite of the fact that the flue gas from the air preheater is at a comparatively low temperature, an efficient reheating of the clean gas can be obtained because, in effect, the crude gas is utilized twice to heat appropriate sections of the regenerative heat exchanger. Another important point is that the recycled portion of the clean gas serves to further increase the temperature of the total clean gas stream. As a consequence, the temperature of the clean gas stream before it enters the heat exchanger is raised to a level such that all of the water droplets entrained therein evaporate before the clean gas enters the heat exchanger in which all of the surfaces are at a temperature sufficient to prevent condensation of water, i.e. are at temperatures above the dewpoint of the clean gas.

As a consequence, depositions on the heat exchange surfaces are completely precluded and any materials which may be soluble in the droplets do not deposit as solids in the heat exchanger.

It has been found to be important, as noted previously, that downstream of the regenerative heat exchanger a quantity of the clean gas is branched from the total flow of the clean gas and is reintroduced into the total flow of the clean gas upstream of the heat exchanger.

In this case, the reheating and predrying of the clean gas is effected primarily by recycling of a portion of the clean gas and without the additional heat contributed by the heat exchanger.

In the third embodiment of the invention, upstream of the regenerative heat exchanger, a portion of the crude gas stream is branched from the main flow thereof and is delivered directly to the total flow of the clean gas stream, also upstream of the heat exchanger to raise the temperature of this clean gas stream in the manner described.

This latter approach can be utilized in desulfurization installations utilizing, for example, a number of treatment stations and in which generally only about 35 to 70 percent of the crude gas leaving the preheater is passed through the scrubber while the balance is customarily returned to the scrubbed gas before it enters the stack as a means of raising the temperature of the stack gases.

In accordance with another feature of the first embodiment of the invention, the branched portion of the crude gas stream, after having traversed its portion of the heating section of the heat exchanger is introduced into the balance of the crude gas stream before it enters a dust separator, thereby minimizing the solids or particulate content of the crude gas stream ultimately entering the scrubber.

In both the first and second embodiments of the invention, I may provide that the branched portion of the clean gas which is to be returned to the balance of the clean gas upstream of the heat exchanger, traverses a respective portion of the heat exchanger in counter flow to the flow of the gas through the heat exchanger which heated this portion and in counter flow to the flow of clean gas through its portion of the heat exchanger.

This tends to balance the gas distribution on opposite sides of the heat exchanger.

The first embodiment of the invention can be carried out effectively with a mutliflow regenerative heat exchanger having a stationary regenerative chamber with two concentric stationary hoods for the feed and discharge of the heating medium. The term "hoods" is used herein to refer to any cap, feeder or other enclosure for a portion of the heat storage mass of the regenerative heat exchanger which can distribute the gas to or recover the gas from a respective portion. The heat exchanger also includes rotating feed and discharge double hoods on opposite end faces of the regenerative chamber for two different gas streams to be heated and which can communicate with connecting ducts extending into the fixed feed and recovery hoods.

According to the invention, the fixed feed and recovery hoods can exclusively communicate with the outer heat storage mass or section while the outer portion of the feed and recovery double hood communicates only with outer portion of the heat storage mass and the inner portion of the feed and recovery double hood communicates only with the inner heat storage mass. On both sides of the inner heat storage mass respectively a feed and discharge rotary fitting can be provided for a second heating medium stream which communicates with a stationary connecting duct.

In this manner, a multistream regenerative heat exchanger can be provided which is of comparatively simple construction and can utilize two different heating medium streams and two different gas streams which are to be heated and which are passed through the heat storage masses in functionally interchanged relationship for optimum utilization of the thermal energy carried by the heating medium streams.

According to a feature of the apparatus aspects of the invention, therefore, in which rotating feed and recovery double hoods are provided in one of the rotating feed and double hoods the inner portion and in the other rotating feed and recovery double hood the outer portion serves as the gas feeder.

It has been found to be especially important for multiflow regenerative heat exchangers of the type described that the inner part of this other feed and recovery double hood, which serves as a recovery hood, be provided with a connecting duct which ends in the connecting duct for the outer portion serving as the feed hood. This allows the relatively high temperature heated recycled clean gas portion to contribute heat to the clean gas before it enters the heat exchanger and even before the recycled portion of the clean gas is added thereto or as it is added thereto.

This termination of the duct can be provided along a cylindrical wall and its end wall with openings through which the recirculated portion of the clean gas can be distributed in the balance of the clean gas. These openings can be at least partly oriented opposite to the flow direction of the gas in the surrounding duct or passage to generate an optimum turbulence and thereby improve the mixing characteristics.

A regenerative heat exchanger for carrying out the second embodiment of the method of the invention utilizes a fixed regenerative chamber whose heat storage mass is supplied with a heating medium stream by fixed feed and recovery hoods while rotating feed and recovery hoods are provided on opposite end faces of the regenerative chamber for the gas stream to be heated and which can be delivered to the feed hood and discharged from the recovery hood of the rotating hood pair from stationary fittings or ducts. The heat storage mass of the regenerative chamber can be provided with a free annular compartment communicating with fixed feed and recovery hoods and forming a path for the recirculated portion of the clean gas stream. This has the advantage of providing a comparatively short and efficient path for this recycled portion of the clean gas stream, enabling it to be distributed in the incoming clean gas stream for mixture therewith upstream of the heat storage mass in the manner described previously.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
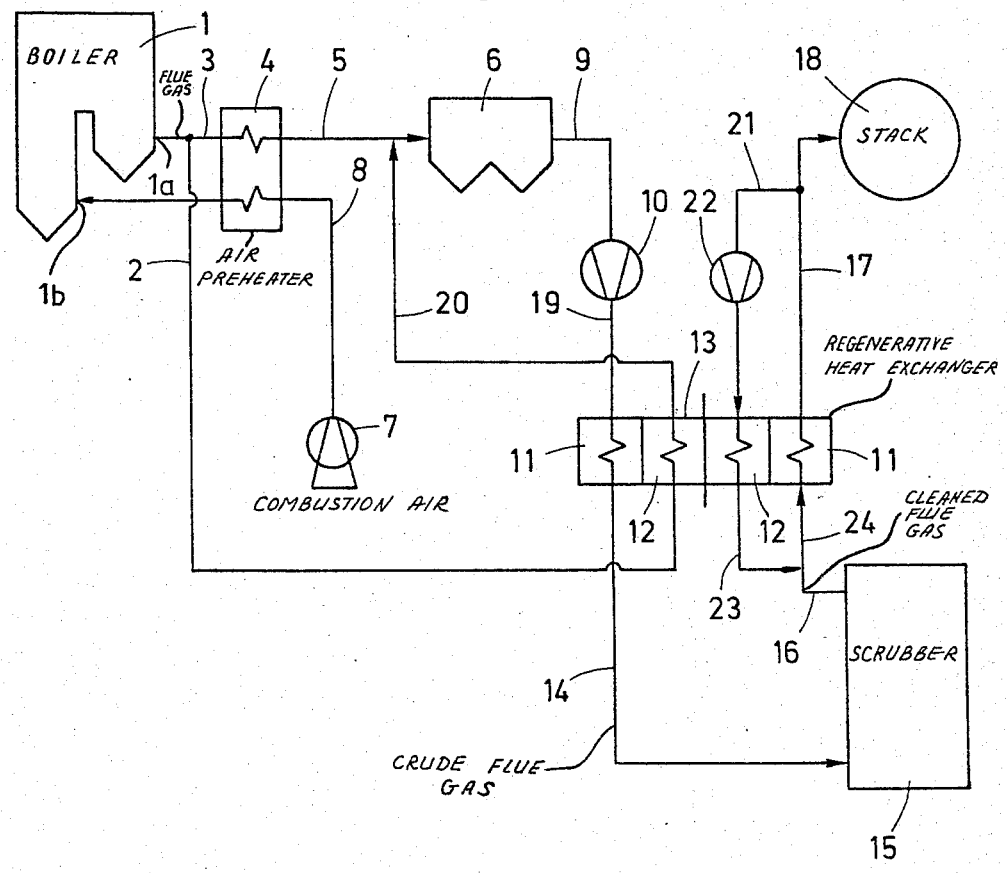
FIG. 1 is a flow diagram of a system for carrying out the method of the first embodiment of the invention.

FIG. 1 shows, highly diagrammatically, a steam electric-power generating plant which is provided with a wet scrubbing installation for treating the flue gas and has the usual steam producing boiler which has been represented at 1 and will be understood to include at least one combustion chamber to which combustion air is fed. The burner, means for feeding fuel (usually a fossil fuel) to the burner and the details of the combustion chamber, of course, have not been illustrated.

The flue gases which are recovered from the combustion chamber are discharged at 1a and as represented by the line 3, are delivered to an air preheater 4. The crude flue gas has a temperature of about 350° C. upon leaving the combustion chamber. About 3.5% by volume of the total crude gas is branched at 2 from the main stream and is passed through a portion 12 of a first section of a regenerative heat exchanger 13 which has two sections 11, 12 which are functionally interchangeable.

The remainder of the crude flue gas, leaving the air preheater 4 at 5 has a temperature of about 130° C. and is introduced directly into an electrostatic filter 6 or in some other dust separator.

A blower 7 and a duct 8 deliver the combustion air via the air preheater 4 to the combustion chamber of the boiler at 1b, i.e. to the burner system of the boiler 1.

Practically all solids and other particulates within the crude gas stream are removed in the dust collecting filter 6 and from the latter the crude flue gas stream passes via line 9 and the blower/compressor 10 to a second portion 11 of the multiflow regenerative heat exchanger 13.

Via a line 40, the somewhat cooled crude gas is fed to a scrubber 15 which may be operated with a conventional scrubbing liquid, e.g. water, to which a desulfurizing agent, e.g. lime, may have been added.

The resulting product is clean gas and is recovered at 16. The clean gas is then passed through the corresponding portion 11 of a second section of the heat exchanger in counter flow to the flow of the crude gas through this section previously. The clean gas, reheated in the heat exchanger portion 11 of the second section is carried by the duct 17 to the stack or chimney 18. The clean gas leaving the scrubber 15 has usually a temperature of about 45° C. and contains a relatively high proportion of water (generally up to about 1 gram per cubic meter S.T.P.), primarily in the form of droplets.

The droplets entrained in this clean gas generally solubilize salts and would, apart from the present invention, deposit such salts in the heat exchanger mass traversed by this gas stream. To insure that the water is all in a vapor phase when it enters the heat exchanger and that the clean gas stream is free from water droplets, a portion of the clean gas stream (previously heated by passage through the section 11 of the heat exchanger 13) is branched at 21 and further heated by a compressor 22 before it is passed through the heat exchanger portion 12 which was previously heated by the branched portion of the flue gas. This further raises the temperature of the gas at 23 which is introduced into the clean gas stream to form a heated mixture at 24, free from droplets of water, before this gas enters the heat exchanger portion 11.

The section 12 of the heat exchanger previously heated by the branched portion of the hot flue gas at 350° C. thus is at a relatively high temperature when encountered by the compressed recycled portion of the clean gas stream in counter flow to the flow of gas during the heating phase. Each section of the heat exchanger is heated during the heating phase and is cooled during the heat transfer phase in which this section serves to heat the clean gas streams in the manner described.

The new cooled branched portion of the crude flue gas is introduced preferably via the line 20 upstream of the electrofilter 6 into the main body of the crude gas stream as shown in FIG. 1 so that the electrofilter also serves to remove any particulates from this branched portion of the crude gas stream before it is scrubbed.

The thermal energy stored in a portion 11 corresponds to a temperature drop of about 130° C. to about 45° C. for the main body of the crude flue gas and to a temperature drop of about 220° C. for the branched portion of the flue gas. When the two sections of the heat exchanger are functionally interchanged for counter flow through the two portions 11, 12 thereof by the main stream of the clean gas and the recycled portion of the clean gas, this thermal energy is transferred to the clean gas.

I have found that to raise the temperature of the clean gas entering its heat exchanger section 11 by about 10° C., i.e. from about 45° C. to about 55° C., about 5 to 6% of the clean gas at line 11 must be recirculated via line 21 and the compressor or blower 22. During this recirculation, the recirculated portion of the clean gas is heated from a temperature of about 100° C. to a temperature of about 233° C. before being admitted to the line 24.

Such a temperature elevation of the total flow of the clean gas will result in evaporation of any water droplets which may be contained therein and will therefore constitute a drying process. This ensures that there will be no significant deposition or contamination of the heat storage mass of the regenerative heat exchanger contacted by the clean gas.

The clean gas is heated in the regenerative heat exchanger to a temperature of about 100° C. before it enters the stack or chimney 18.

Figure 2:
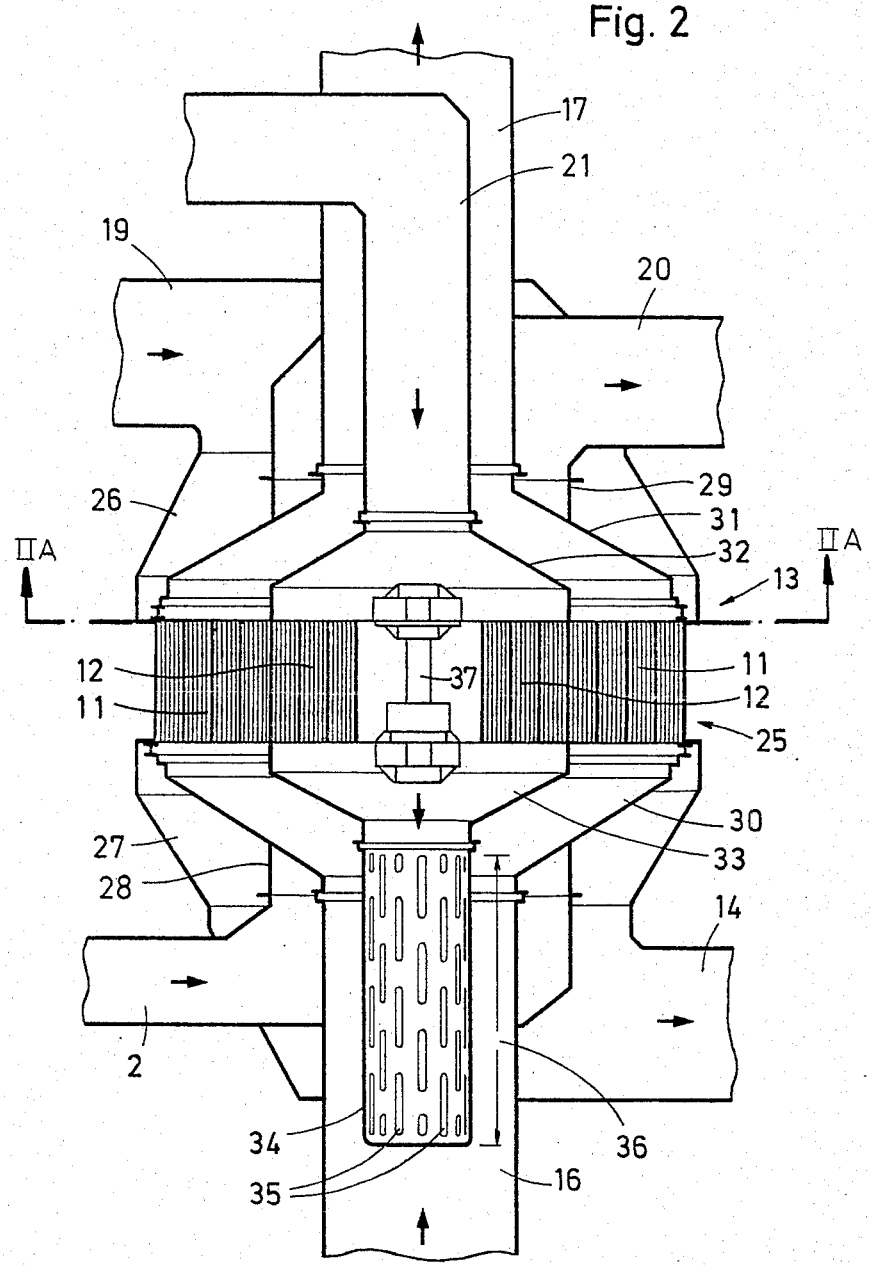
FIG. 2 is a diagrammatic axial cross-sectional view through a regenerative heat exchanger for use in this system.

A multiflow regenerative heat exchanger for carrying out the method illustrated in FIG. 1 has been shown in FIG. 2.

The heat exchanger comprises a fixed regenerator chamber 25 containing two concentrically oriented heat storage masses forming the portions 11 and 12.

At one end face of the fixed regenerator chamber 25, I provide a fixed feed hood 26 which can be supplied with the total flow of the crude flue gas via the duct 19 and which exclusively communicates with the heat storage mass 11. The gases traversing the heat storage mass 11 from the hood 26 enter the fixed discharge hood 27 at the opposite side of the heat exchanger chamber and are carried to the scrubber via the duct 14.

Within the discharge hood 27 a rotating feed fitting 28 is provided which can exclusively communicate with the portion of the heat storage mass 12 of the regenerative chamber to be traversed by the branched portion of the crude gas stream. This fitting communicates with the line 2 previously described.

On the opposite side of the regenerative chamber 25, a discharge rotary fitting 29 is provided which communicates continuously with a stationary discharge duct 20 and corresponds in location to the fitting 28 to serve to carry off the branched portion of the flue gas and thus is in communication exclusively with the corresponding portion of the heat storage mass 12. From the duct 20, of course, this recovered portion of the crude flue gas is introduced into the main portion of the crude flue gas before it enters the electrofilter.

From FIG. 2 it will also be apparent that the crude gas main streams from the feed hood 26 through the discharge hood 27 and the branched crude streams from the rotary feed fitting 28 to the discharge feed fitting 29 are in counter flow.

The clean flue gas from the scrubber enters via the stationary fitting 16 into a rotary feed hood 30 which is so constructed and arranged that it only communicates with a portion of the heat storage mass 11 of the regenerative chamber 25 through which the clean gas is to be passed. A corresponding discharge hood 31 is rotatably coupled with the hood 30 and is disposed on the opposite side of the regenerative chamber 25 to receive the heated clean gas and deliver it to the stationary duct 17 which has previously been described.

Within the rotary discharge duct 31, a rotary feed duct 32 is disposed to communicate only with a portion of the heat storage mass 12 to be traversed by the recirculated portion of the clean gas and this feed hood is in communication with a stationary duct 21 supplying the recirculated portion of the clean gas.

On the other side of the regenerative chamber 25, registering with the rotary feed hood 32, is a rotary discharge hood 33 which is coupled with the rotary feed hood 32 and which receives the aforementioned portion of the clean gas and distributes it within the main body of the clean gas traversing the duct 16.

To this end, the hood 33 is provided with a duct 34 which is coaxial with the duct 16 and opens into the latter via outlet openings 35 formed in the cylindrical wall and the end wall of the duct 34. The gas passing in counter flow through the duct 34 thus can flow outwardly through these openings into the oppositely flowing clean gas stream. The outlets can be uniformly distributed and can in part be oriented transverse to the flow direction in the duct 16. This ensures a highly turbulent mixture of the recirculated portion of the clean gas stream and the main body of the clean gas stream.

The ducts 34 and 16 thus form a mixing stretch 36 in which intensive turbulence is effected between the relatively low temperature main body of the clean gas and the proportionately high temperature but smaller proportion of the recycled clean gas. Within this mixing stretch 36, the temperature level of the mixture is raised so that any entrained water droplets are evaporated and hence a predrying occurs. The predried clean gas stream is then further heated by contact with the heat storage mass 11 and the resulting heated gas is discharged through the duct 16, 17 into the stack.

From FIG. 2 it will also be apparent that the mutliflow regenerative heat exchanger 13 can be relatively simple and inexpensive because it is largely symmetrical and does not require rotary heat storage masses. Only the rotary hoods need communicate with the selected portion of the respective heat storage masses while the stationary hoods can remain in communication with the balance of the heat storage masses in each case. The shaft 37 represents a coupling between the rotary hoods on opposite sides of the heat exchanger. While the rotary hoods appear to be cylindrical from the view shown in FIG. 2, as will be apparent from FIG. 2A, these hoods are elongated to encompass only restricted portions of the respective flanks of the heat exchanger.

Figure 2A:
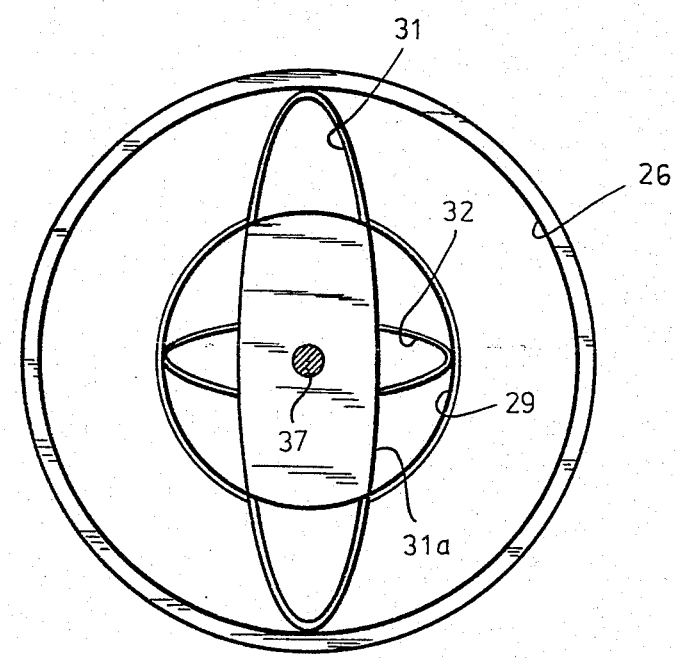
FIG. 2A is a view taken along the line IIA—IIA in FIG. 2.

In FIG. 2A, I have shown a wall 31A which blocks the rotating hood 31 from communication with the inner ring of the regenerative heat exchanger mass 12. The fitting 29 can rotate with the hood 31.

The rotary fittings 28 and 29 and the rotary hoods 30–33 can all be connected together by the shaft 37 so that the assembly can be rotated by a common drive. It should also be apparent from FIGS. 2 and 2A, that on the one hand the rotary feed hood 30 and the rotary discharged hood 33 and, on the other hand, the rotary discharge hood 31 and the rotary feed hood 32 can each be constituted as double hoods in respective units which can be embraced by substantially radially directed arms of the rotary fittings 28 and 29. In any event, the effective sector angles or cross sections or widths of the rotary hoods and the rotary fittings 28 and 29 should be such that the free flow cross sections suffice for the purposes described.

As previously described, the recirculated portion of the clean gas was heated by heat derived from a portion of the crude gas separated from the main flow of the crude gas upstream of the air heater. In this embodiment as well, the total crude gas stream from the electrofilter passes around hoods 31 and 30 and only heats the outer portion 11 of the heat storage mass of the regenerative chamber 25. The partial stream of crude gas only passes through the heat storage mass 12 of the regenerative chamber via the rotary fittings 28 and 29. The clean gas flows through the rotary hoods 30 and 31 also only through selected portions of the heat storage mass 11 and counter flow to the crude gas while the partial flow of clean gas traverses the rotary hoods 32 and 33 also in counter flow to the partial flow of the crude gas through the heat exchanger mass 12.

Figure 3:
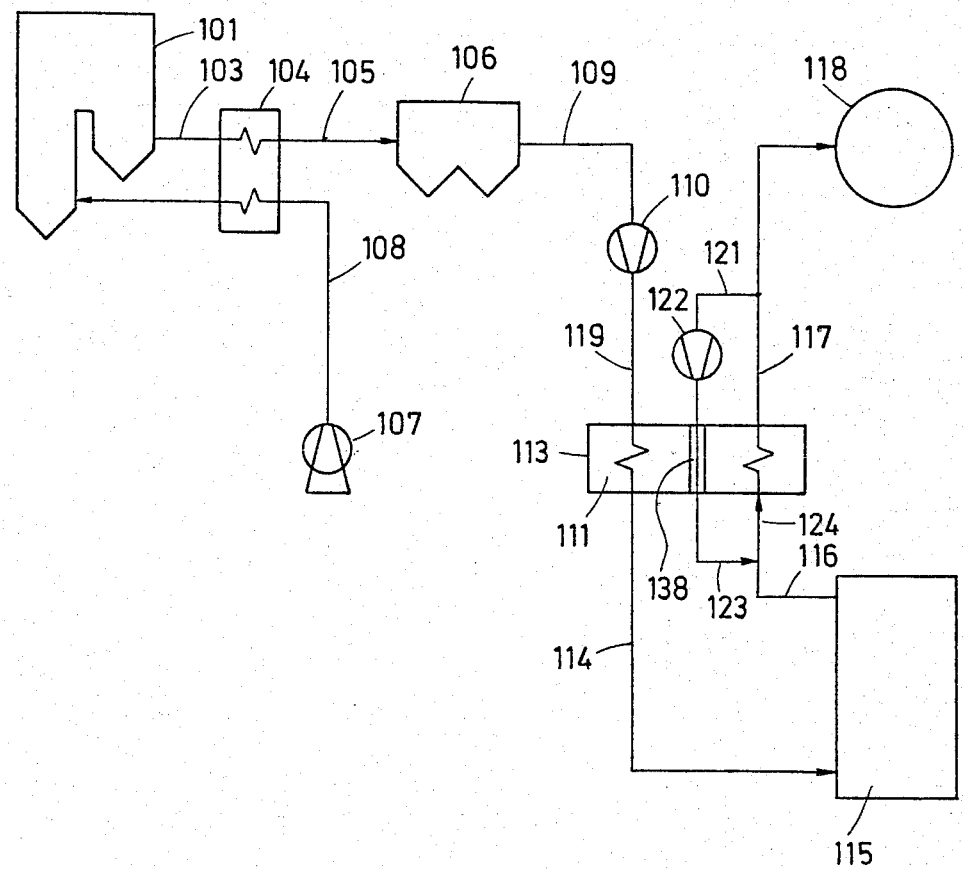
FIG. 3 is a flow diagram generally similar to FIG. 1 but illustrating a second embodiment of the method of the invention.

FIG. 3 shows a power plant in which the total flow of flue gas from the boiler 101 is delivered via line 103 to the air heater 104 which it enters at a temperature of about 350° C. The flue gas is thereby cooled to a temperature of 130° C. while heating the combustion air which is supplied by a blower 107 and a line 108 to the boiler.

The flue gas is then delivered to an electrofilter 106 via line 105.

From the electrofilter 106, flue gas is carried via line 109 and a blower 110 through a duct 119 to a regenerative heat exchanger 113 having a heat storage mass 111, the sections of which can be functionally interchanged in the manner described.

Via duct 114 the dust-free and further-cooled crude flue gas is delivered to the scrubber 115 and the clean gas leaving the scrubber via duct 116 is fed to the heat exchanger 113 to be reheated before entry into the duct 117 and delivery to the chimney or stack 118.

The gas leaving the scrubber has a temperature of about 45° C. and a relatively high water content (up to about 1 gram per cubic meter S.T.P.), largely in the form of droplets.

To evaporate these droplets, a portion of the heated clean gas is branched from the line 117 at 121 and is recycled by a blower/compressor 122 through a passage 138 (a free annular space) in the heat exchanger chamber 125 of the heat exchanger 113 to rejoin the clean gas as represented at 123 upstream of the heat exchanger 113. The amount of clean gas thus branched can be about 5 to 6% as previously described.

Otherwise the system operates in the manner described to evaporate water droplets and prevent the deposition of contaminants within the heat exchanger mass.

Figure 4:
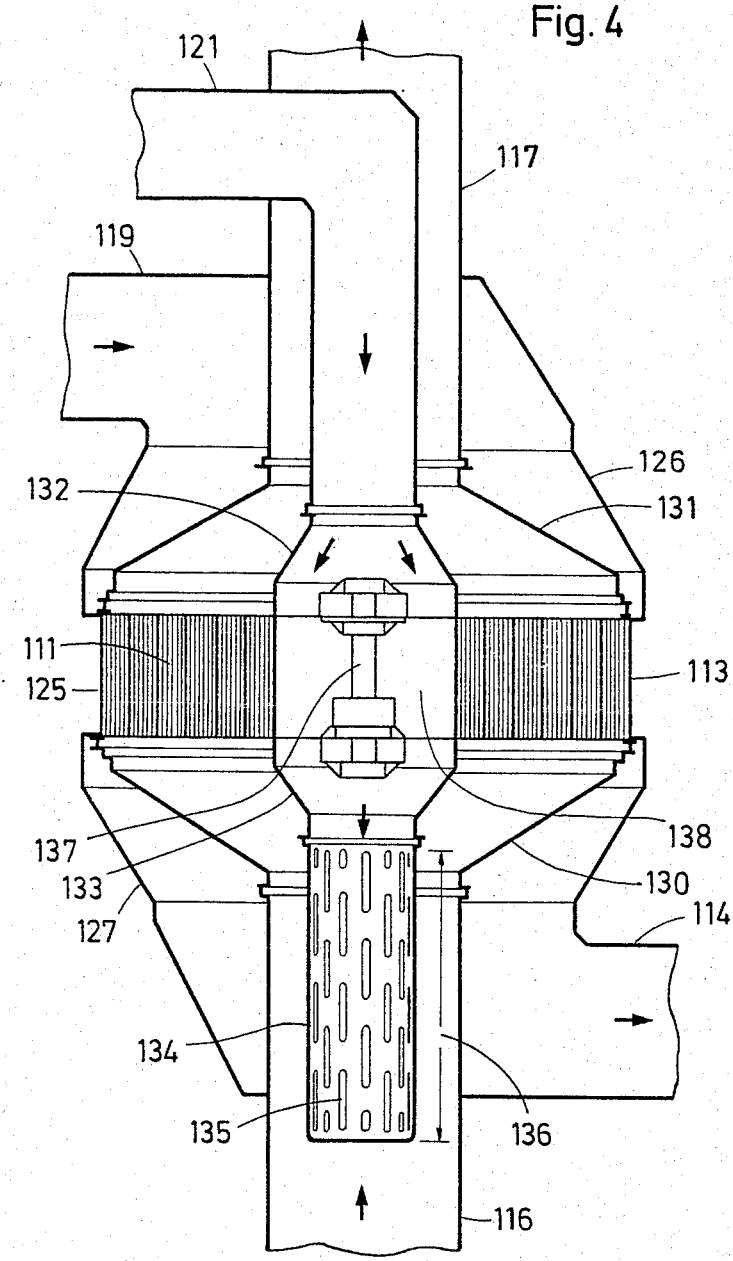
FIG. 4 is an axial cross-sectional view diagrammatically illustrating a regenerative heat exchanger for use in the method of FIG. 3.

A regenerative heat exchanger for use in the system of FIG. 3 has been illustrated in FIG. 4 and comprises the stationary regenerative chamber 125 containing the heat storage mass 111. At one end of this heat storage mass, a fixed feed hood 126 connected to the duct 119 is provided. The feed hood 126 communicates through the heat storage mass 111 with the discharge hood 127 which is also stationary and is connected to the duct 114.

Within the stationary discharge hood 127, a rotary feed hood 130 is provided which communicates between the heat storage mass 111 and the scrubber 115 for delivering the clean gas to the regenerative heat exchanger mass 111 over only a portion of the mass. The duct 116 communicates with the rotary hood 130.

On the opposite side of the heat storage mass and registering with the hood 130 is a discharge rotary hood 131 which is connected to the fixed duct 117 running to the stack.

Within the discharge hood 131 is a stationary feed hood 132 which communicates with an annular chamber 138 left within the heat storage mass 111 of the regenerative chamber 125 and serving to return the recirculated portion of the clean flue gas to the main clean flue gas stream delivered by the duct 116. To this end, a stationary discharge hood 133 is provided on the opposite side of the regenerative chamber 125 and is connected to a duct 134 which terminates within the duct 116 and is coaxial therewith. The duct 134 is formed with an array of staggered slots forming outlets for discharging the clean gas portion into the main clean gas stream in the manner previously described for mixture along a mixing stretch 136.

Here as well the rotary hoods 130 and 131 are interconnected by the shaft 137 so that they can be driven by a common drive. In this embodiment, the portion of the recirculated clean gas is not additionally heated in the regenerative heat exchanger.

Figure 5:
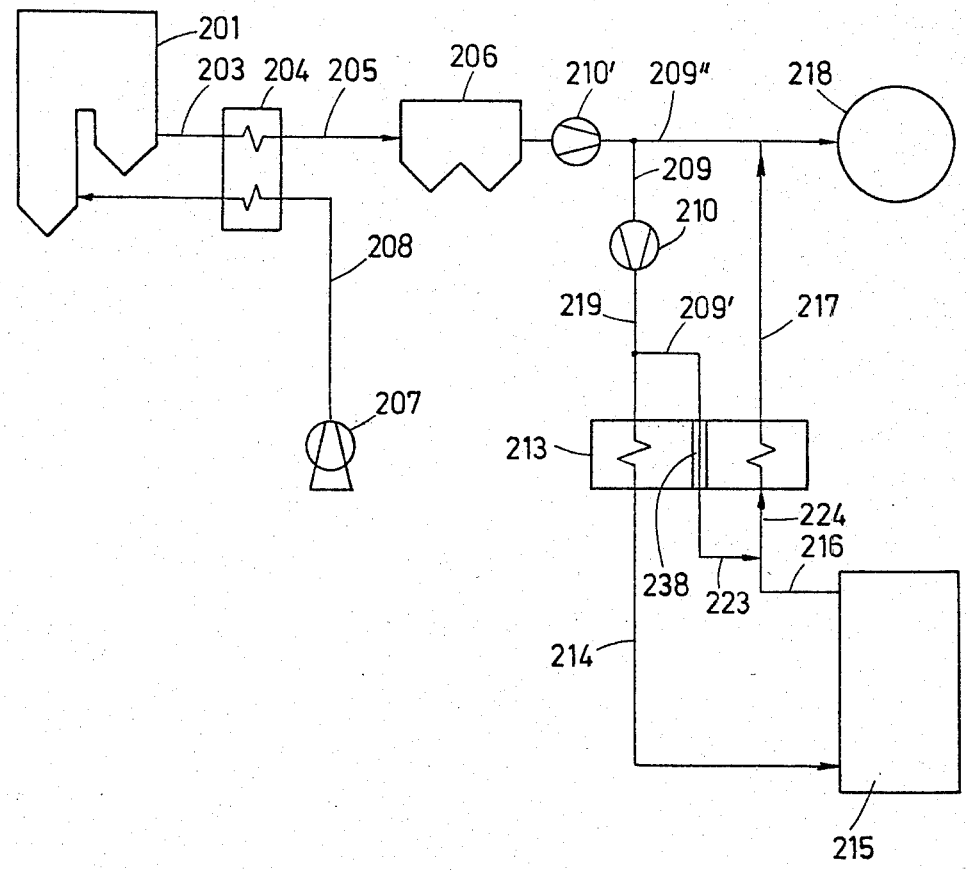
FIG. 5 is a flow diagram illustrating still another method embodying the present invention, i.e. the third embodiment of the method.

In FIG. 5 still another embodiment of the invention is illustrated. In this embodiment, the crude flue gas is withdrawn from the boiler 201 via line 203 at a temperature of about 350° C. and is passed through the boiler air heater 204 through which the combustion air is passed via a blower 207 and a duct 208.

The crude flue gas, now at a temperature of about 175° C. or approximately half less than the entry temperature, is delivered via line 205 to the electrostatic filter 206 or another dust removal device.

Within the electrostatic filter 206, solids and other particulates are removed from the gas before the crude gas is compressed by the compressor or blower 210 in a duct 209 and delivered directly to the stack 218.

Between 35 and 70% by volume of the crude gas is branched at duct 209 from the stream leaving the compressor 210' and is delivered via another compressor 210 and a duct 219 to the regenerative heat exchanger 213.

Successive sections of the heat exchanger are heated by this gas stream before it is introduced into the scrubber 215 via line 214.

A branched portion of the relatively hot crude gas, after removal of the particulates, is withdrawn at 209' and passed through a free section 238 of the heat exchanger for mixture at 223 with the clean gas stream emerging from the scrubber 215 at 216. The thus heated clean gas stream, now at a temperature precluding the presence of water droplets therein, is delivered at 224 to the heat exchanger 213 to pass through the previously heated portions of the regenerative heating mass therein and entry into the line 217 for recombination with the nonscrubbed crude gas and entry into the stack 218.

Here again, because of the increase in temperature of the clean gas traversing the heat exchanger, droplets are excluded and deposits within the heat exchanger mass are prevented.

The reheated clean gas stream thus serves to dilute the crude gas delivered to the stack to bring the sulfur content thereof below the maximum permitted by law for discharge into the environment.

Figure 6:
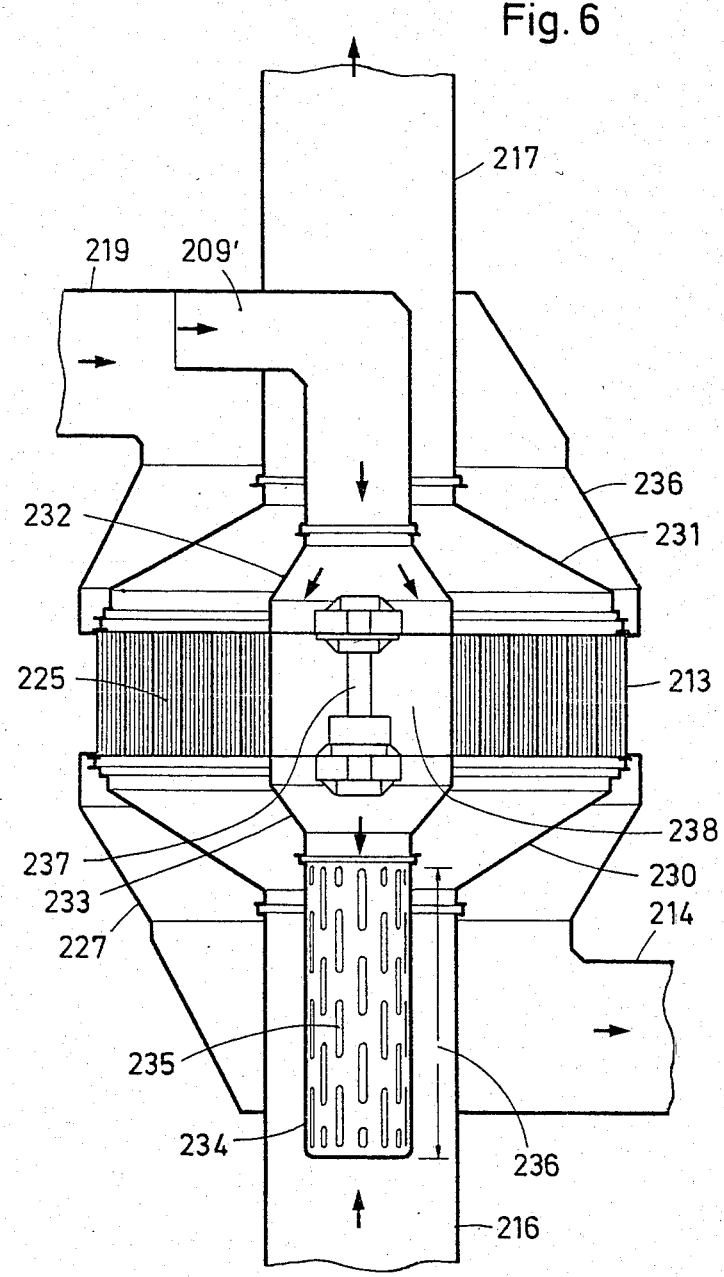
FIG. 6 is an axial cross-sectional view diagrammatically illustrating a regenerative heat exchanger for use in this latter embodiment.

FIG. 6 shows a heat exchanger for use with the system of FIG. 5. This heat exchanger 213 differs from the heat exchanger illustrated in FIG. 4 only in one respect. Hence, apart from the difference described below, the heat exchanger of FIG. 6 can be understood to correspond to that of FIG. 4 with corresponding reference numerals in the 200 series representing identically functioning structure to the elements identified in the 100 series in FIG. 4.

The difference between the regenerative heat exchanger of FIG. 6 from the regenerative heat exchanger of FIG. 4 is that instead of a stationary connecting duct 121 for a portion of the clean gas, a stationary connecting duct 209 is provided for a portion of the crude gas. To permit this portion of the crude gas to be tapped, the connecting duct 209' passes laterally through the wall of the duct 217 and opens into the connecting duct 219 of the stationary hood 226 to pick up the portion of the crude gas. Consequently, hot crude gas is turbulently mixed in the stretch 236 with the clean gas supplied by duct 216.

I claim:

1. A regenerative heat exchanger for processing a crude flue gas from a boiler comprising:

a stationary regenerated heat exchanger mass adapted to be traversed by a gas;

a fixed feed hood communicating with one side of said mass and a fixed collection hood communicating with an opposite side of said mass;

a rotary feed hood and a rotary collection hood on opposite sides of said mass within said fixed hood for communicating with registered limited portions of said mass;

means for introducing a first gas stream into one of said feed hoods and for conducting said first gas stream from the corresponding collection hood and means for introducing a second gas stream into the other of said feed hoods and for collecting said second gas stream into the other collection hoods whereby said first and second gas streams are passed in a regenerative indirect heat exchange relationship through said mass, said means including respective fixed ducts communicating with said hoods;

and respective fittings on opposite sides of said mass for passing a third gas stream through said heat exchanger.

2. The heat exchanger defined in claim 1 wherein said fittings communicate with an inner annular portion of said mass and said hoods communicate with an outer annular portion of said mass to said heat exchanger, further comprising additional feed and collection hoods within said fittings for communication with registering parts of said inner portion of said mass for passing a fourth gas in an indirect heat exchange with said third gas stream via said mass.

3. The heat exchanger defined in claim 1 wherein the feed hood for one of said gas streams lies within the collection hood for the other gas stream and the collection hood for said one of said gas streams lies within the feed hood of said other gas stream.

4. The heat exchanger defined in claim 1 wherein said rotary hoods form double hoods on opposite sides of said mass.

5. The heat exchanger defined in claim 1, further comprising a common shaft coupling said rotary hoods together for joint rotation.

6. The heat exchanger defined in claim 1 wherein said fittings communicate with a free annular compartment of said heat exchanger surrounded by said mass and enabling a gas stream to traverse said heat exchanger without encountering said mass.

* * * * *